No. 622,534. Patented Apr. 4, 1899.
P. E. PRESCHLIN.
JOINT FOR THIN METAL PIPES.
(Application filed Aug. 2, 1898.)
(No Model.)
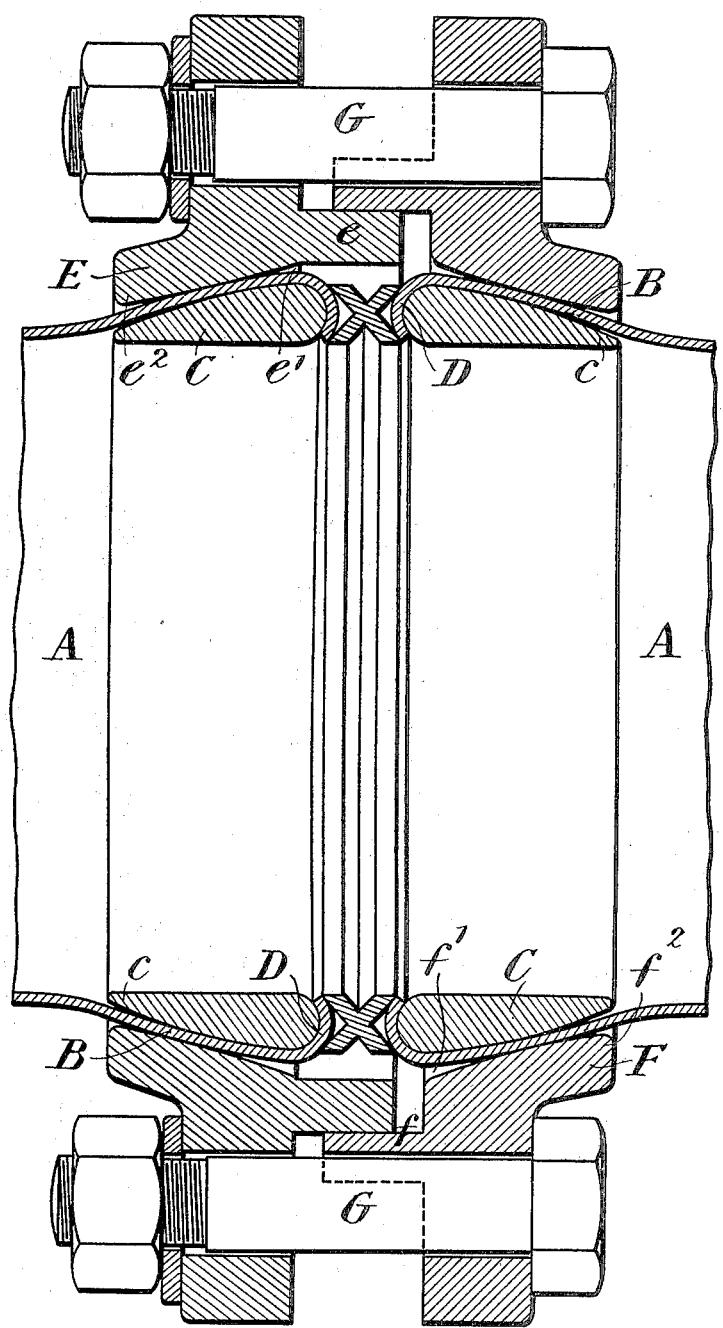
Witnesses
George B. Blemming
L. M. Redman
Inventor
Paul Ernst Preschlin
by Bakewell & Bakewell
his attys.

UNITED STATES PATENT OFFICE.

PAUL ERNST PRESCHLIN, OF SCHLADEM-ON-THE-SIEG, GERMANY, ASSIGNOR OF ONE-HALF TO THE ELMORE'S GERMAN AND AUSTRO-HUNGARIAN METAL COMPANY, LIMITED, OF LONDON, ENGLAND.

JOINT FOR THIN-METAL PIPES.

SPECIFICATION forming part of Letters Patent No. 622,534, dated April 4, 1899.

Application filed August 2, 1898. Serial No. 687,525. (No model.)

*To all whom it may concern:*

Be it known that I, PAUL ERNST PRESCHLIN, a citizen of Switzerland, residing at Schladem-on-the-Sieg, Rhenish Prussia, Germany, have invented a certain new and useful Joint for Thin-Metal Pipes, of which the following is a specification.

This invention relates to a joint for thin-metal pipes, such as those made of copper or brass, as will be described with reference to the accompanying drawing, which is a longitudinal section of parts of two pipes joined together according to this invention.

As shown in the drawing, which is a longitudinal section of a pipe-joint constructed in accordance with my invention, each pipe A has its mouth conically widened, as at B, and within this mouth is fitted a metal ring C, preferably of phosphor-bronze or like metal, this ring having externally a taper nearly fitting that of the pipe-mouth and internally a cylindrical face parallel to the axis of the pipe and about the same as its internal diameter. The front end of the ring is semicircularly rounded at D, and over this rounded end the end of the pipe is bent. Outside the two pipes thus prepared are fitted flanged rings E and F, these having been strung on the pipes before their ends were widened. In order to center these rings relatively to one another, it is preferred to make them with projecting lips $e$ and $f$, the one fitting within the other. Between the rounded ends of the pipes is interposed a packing-ring, which may be, as shown, of cruciform section. The two rings E and F are then drawn together by screwing up nuts on bolts G, passing through their flanges, the rounded ends of the pipes being thus strained against the packing-ring, so as to form a tight joint. In order to impose the pressure of the rings upon the metal of the pipes where it is least liable to be injured by pressure, the rear parts of the rings C are shaped at $c$ so as to be somewhat less in diameter than the parts of the pipe facing these parts, and the front and rear parts of the rings E and F are shaped, respectively at $e'$ and $f'$ and at $e^2$ and $f^2$, so as to be somewhat larger in diameter than the parts of the pipes facing them. Thus the pressure of the rings is imposed chiefly on the metal of the pipes where there is little or no bending of the metal.

Having thus described the nature of this invention and the best means I know of carrying the same into practical effect, I claim—

1. The combination with a pair of thin-metal pipes, having outwardly-swelled end portions with their ends bent around inner strengthening-rings fitted within the swelled portions, of a packing-ring seated between the rounded ends, and a pair of clamping-rings having inclined inner faces with the intermediate portion only of such faces bearing upon the outside of the swelled portions, and means for drawing said clamping-rings toward each other; substantially as described.

2. The combination with a pair of pipes having outwardly-swelled end portions with their ends bent inwardly around rings having rounded ends seated within the swelled portions, of a packing-ring interposed between the rounded ends, and a pair of clamping-rings having inclined inner faces bearing upon the swelled portions, said clamping-rings having connecting-bolts by which they are drawn together, and being provided with interfitting guides; substantially as described.

In testimony whereof I have hereunto set my hand in presence of two subscribing witnesses.

PAUL ERNST PRESCHLIN.

Witnesses:
WILLIAM H. MADDEN,
EDWARD HALTER.